United States Patent [19]
Mercier et al.

[11] 3,920,788
[45] Nov. 18, 1975

[54] PREPARATION OF URANIUM COMPOUNDS

[75] Inventors: Henri Mercier, Gardanne; Robert Jean, Aix-en-Provence, both of France

[73] Assignee: Pechiney Ugine Kuhlmann, Lyon, France

[22] Filed: Sept. 25, 1972

[21] Appl. No.: 292,086

[30] Foreign Application Priority Data
Sept. 28, 1971  France .............................. 71.34751

[52] U.S. Cl. .................................... 423/18; 423/20
[51] Int. Cl. ............................................ C01g 43/00
[58] Field of Search ................................ 423/18, 20

[56] References Cited
UNITED STATES PATENTS

| | | | |
|---|---|---|---|
| 890,584 | 6/1908 | Fleck et al. ........................ | 423/18 |
| 2,176,610 | 10/1939 | Stamberg ........................... | 423/18 X |
| 2,733,126 | 1/1956 | Spiegler ............................. | 428/20 |
| 2,769,686 | 11/1956 | McCullough et al. ............ | 423/18 X |
| 2,894,809 | 7/1959 | McCullough et al. ............ | 423/18 X |
| 3,100,682 | 8/1963 | Kelmers ............................. | 423/18 X |

*Primary Examiner*—Benjamin R. Padgett
*Assistant Examiner*—R. E. Schafer

[57] ABSTRACT

A method for the production of uranium compounds in a high state of purity comprising the steps of contacting a uranium bearing material with aqueous sulphuric acid, adjusting the ratio of water and sulphuric acid in the resulting leach solution to within the range of 0.16 to 0.26 to precipitate impurities from the first leach solution, diluting a second leach solution after removal of the precipitate formed to adjust the ratio of water and sulphuric acid to within the range of 0.35 to 0.50.

5 Claims, 1 Drawing Figure

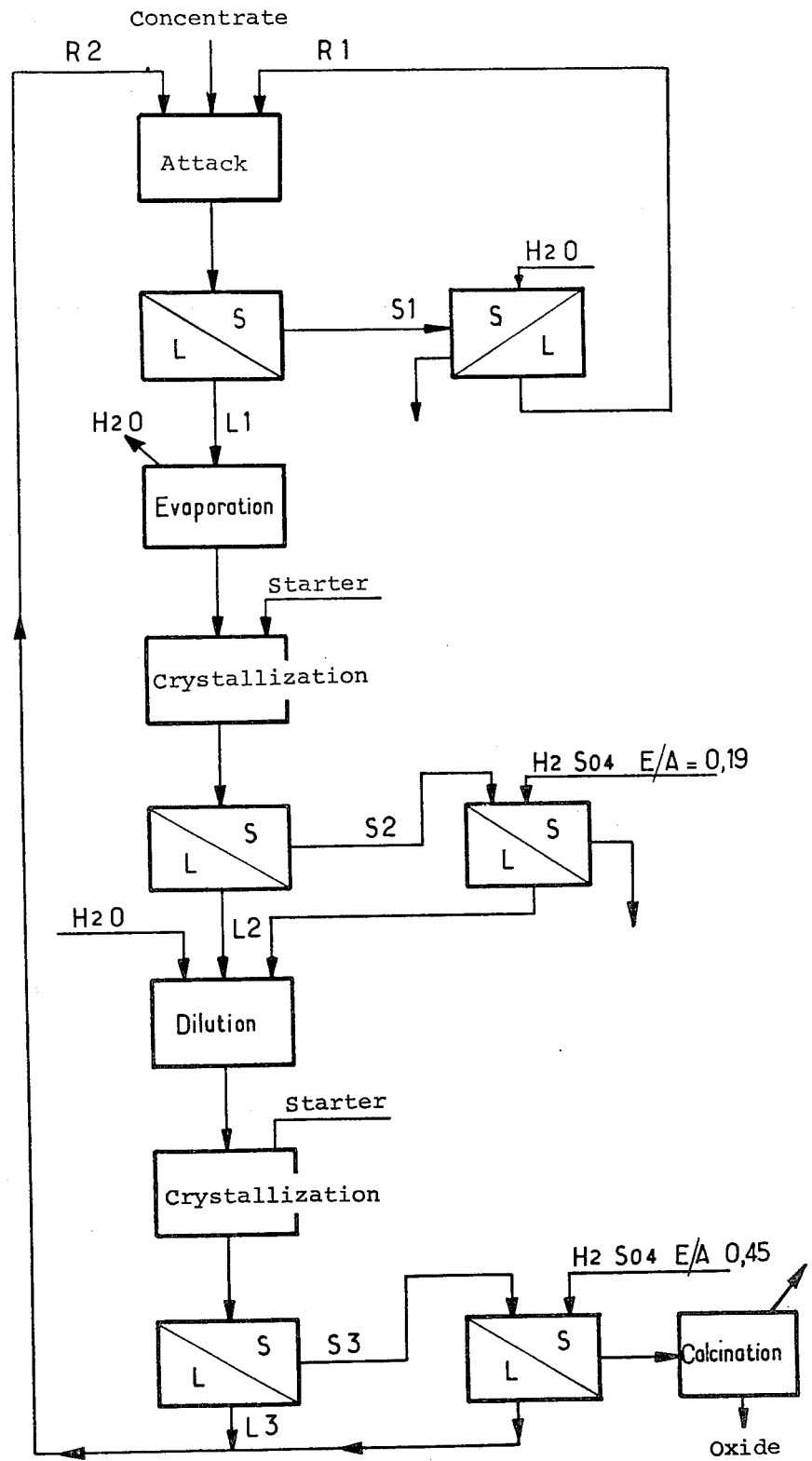

PREPARATION OF URANIUM COMPOUNDS

The present invention relates to the field of extracting uranium from the raw materials which contain it.

Obtaining uranium from its ores generally comprises lixiviation of the uranium-bearing rock by a basic or acid solution which dissolves uranium. The lixiviation operation makes it possible, after separation of the solid impurities, to obtain a weak solution from which uranium is recovered either by selective extraction in an organic solvent, or by selective fixing on an ion-exchanger resin, or by precipitation by means of an alkaline or alkaline-earth base.

The first two modes of procedure require the use of expensive organic products which are costly to use on dilute solutions, but which, after elution and precipitation, give concentrates containing from 65 to 85% of uranium. The third mode of procedure, which involves a convenient precipitation agent, results in a concentrate which titrates from 25 to 80% of uranium, in the form of uranate of the base used for precipitation. The production from concentrates of the latter type of a uranium salt whose purity meets the requirements of the nuclear industry, is conventionally effected by way of extraction by an organic solvent, or an ion exchange on a resin.

These various methods are at present, with the RIP (in which the resin is used in the lixiviation suspension), the only ones which are used on an industrial scale. They suffer from the following disadvantages:

use of organic products which are costly and often difficult to employ, relatively substantial consumption of reactants at the purification stage, such consumption depending more on the method selected than on the amount of uranium recovered, the concentrate obtained with a high uranium content is generally not of sufficient purity to be easily treated in the course of subsequent operations in the nuclear industry, purification by a resin or an organic solvent is conventionally effected with uranium-bearing solutions with a low uranium content (from 1 to 50 g/l), and in which the free acidity must be adjusted to a fairly low level, which results in voluminous and expensive installations.

The present invention, which avoids the use of resin, solvent or other organic product, makes it possible to avoid these disadvantages and to produce a uranium compound whose purity is at least equal to that required for the nuclear industry, operating from an impure concentrate produced for example by precipitation of the clarified ore-lixiviation solution by means of a base such as potassium hydroxide, sodium hydroxide, ammonia, magnesia, lime, etc., and effecting purification in a medium with a high uranium content (100 to 400 g/l).

It has been known for more than 40 years (Colani 1928, quoted by Linke "Solubilities", New York 1958), that uranyl sulphate has a strongly marked maximum of solubility in concentrated sulphuric acid, for values of the weight ratio $H_2O$/free $H_2SO_4$ (which we shall refer to hereinafter for the sake of simplicity as E/A) of the order of 0.165. It may therefore appear surprising that no industrial process for the purification of uranium concentrates, making use of this phenomenon, has been put forward hitherto, in spite of the large amount of research carried out since 1945, regarding extraction of uranium.

The reasons which have possibly discouraged researchers from working on this line are probably as follows:

it is known that solutions in concentrated sulphuric acid give rise to formations of little known, complex or polycondensed salts, which can result in the solution being made very thick, or which can even result in it being caused to solidify in a mass;

there is the tendency to form mixed salts containing both uranium and other cations;

concentrated sulphuric solutions are viscous, which could interfere with filtration operations and give rise to entrainment phenomena. Delays in precipitation are also frequent; the reasons set out hereinbelow could indicate that a sufficient degree of purity would not be obtained directly, bearing in mind the very severe requirements set by the nuclear energy industry, which is the primary user. As it is impossible to carry out treatments by means of resins or organic solvents in the presence of concentrated sulphuric acid, it could be expected that it would be necessary to revert to diluted solutions to carry out the final extraction step, which would destroy any economic interest in such a method.

It is accordingly an object of the present invention to provide a method for producing uranium compounds which overcome the foregoing disadvantages, and it is a more specific object of the invention to provide a method for producing uranium compounds which are capable of producing such compounds with a high degree of purity.

The method according to the invention comprises, after having prepared a solution L1 by the sulphuric attack of an ore or a uranium bearing concentrate, and separation of the undissolved parts by filtration or any other per se known method, the ratio E/A, in the solution L1, 1, of the contents by weight of water E and sulphuric acid A, measured possibly after cooling and separation of the precipitates, is brought to a value of from 0.16 to 0.26, preferably from 0.18 to 0.20.

The precipitate S2 which then forms and which contains most of the impurities contained in the solution L1, is removed, then the remaining liquid phase L2 is diluted until the value of the ratio E/A is from 0.35 to 0.50, preferably from 0.43 to 0.47. There is then formed a precipitate S3 which is formed mainly by uranyl sulphate and which contains a very small amount of impurities. It is recovered by separating it from the remaining liquid phase L3 which can be recycled after possible adjustment to its water content, and the recovered substance is preferably calcined at a temperature in the regions of 900°C.

In the course of the above-mentioned calcination operation, there is obtained on the one hand uranium oxide in a high state of purity, and on the other hand, oxidized sulphur compounds which are advantageously recovered and converted into sulphuric acid, for example by the contact method, the regenerated acid being used in the treatment.

The uranium content of the starting concentrates is advantageously from about 20 to about 85% of uranium. Their impurities concentration can also vary within wide limits. However, organic materials should be avoided, as they convert the solution L1 into a black thick slurry, which considerably interferes with the subsequent liquid-solid separations. Organic materials can be removed beforehand by oxidative roasting at from 300° to 500°C. The calcium content of the treated concentrate is not an obstacle to performing the method. If the treated concentrate contains more than 0.05% of calcium with respect to uranium, it should be removed, as, since its solubility varies in the same manner as the solubility varies in the same manner as the solubility of uranyl sulphate when the ratio E/A passes from 0.16–0.26 to 0.4–0.5, the calcium would precipitate with the uranium. For that purpose, the treated concentrate is subjected to attack with a solution such that the ratio E/A of solution L1 is higher than 0.5. The $CaSO_4$ which is then precipitated is removed with silica.

If the ratio E/A is too low upon attack, iron in a content of higher than 7% can cause solidification of the solution, which is attributed to the formation of polysulphates. The use of a diluted solution L1 whose ratio E/A depends on the iron content, permits this disadvantage to be avoided.

The silica content of the treated concentrate is not an obstacle to performing the method. When the silica shows a tendency to give gels or colloids which are difficult to separate from solution L1, the attack is effected with a relatively diluted solution.

The value of the ratio E/A in the solution L1 is in principle not critical. In the absence of troublesome amounts of calcium, iron or silica, the above-mentioned value can be equal to that retained by the solution L2, the latter value being from 0.16 to 0.26. In the presence of calcium, it has just been seen that the value must be higher than 0.5, preferably 0.6. In the presence of other troublesome elements such as iron and silica (if the latter has a tendency to form gels or colloids), it may be necessary for the ratio E/A to attain values of 1.6.

If the value of the ratio E/A of the solution L1 is higher than 0.26, it is necessary to concentrate the solution to bring the ratio to a suitable value. This operation can be effected by heating to boiling at atmospheric pressure, until the temperature of the solution reaches a value of from 210°C. to 240°C. approximately, which depends on the composition of L1 and the value of the ratio E/A selected for L2.

During cooling to ambient temperature, the solution separates into two phases: liquid L2 and solid S2.

It is preferable during the operation to add crystalline starters whose effect is to prevent delays in crystallization and to increase the size of the crystals obtained.

These starters which can comprise small amounts of crystals collected from a preceding operation, are advantageously added on several occasions, during evaporation or during cooling, at about the moment at which the crystals corresponding to precipitation of the most abundant impurities begin to appear.

The phases L2 and S2 are separated by any known means such as filtration or centrifuging.

The phase S2 is then rinsed. Preferably, rinsing is effected by a sulphuric solution having the same ratio E/A as L2, and the rinsing solution is then joined to L2, or used for the preparation of L1.

S2 contains almost all the impurities contained in L1.

The solution L2 which, according to the circumstances, contains all or only the major part of the uranium of L1, is diluted until the ratio E/A is brought to a value of from 0.35 to 0.5. Dilution is effected naturally with heat being given off. Cooling is then effected to about 30°C. Separation then occurs of a liquid phase L3 and a solid phase S3. Separation is facilitated by the introduction of crystallization starters at the crystallization starting temperature.

The solution L3 which is exhausted is recycled.

After rinsing by a solution having the same value of the ratio E/A as L3, the precipitate S3 is formed by very pure hydrated uranyl acid sulphate, the main impurity being $CaSO_4$ if it was not considered worth while removing the calcium beforehand.

By calcination at a temperature close to 900°C., there is produced on the one hand, in a gaseous form, water and oxygenated compounds of sulphur, which can be recovered, and, on the other hand, oxide $U_3O_8$ in a high state of purity, as will be seen from the examples.

It can be seen that the method according to the invention makes it possible to dispense with any special concentration and extraction reactant. The only reactant used with the water is sulphuric acid which is partly recyclable and partly regenerable by treatment of the oxygenated compounds of sulphur resulting from clacination, for example in a contact installation.

Having described the basic concepts of the invention, reference is now made to the following examples, which are provided by way of illustration and not by way of limitation, of the practice of the invention.

EXAMPLE 1

A uranium-bearing concentrate based on sodium uranate, whose composition before and after calcination at 500°C. for removing the organic materials, is given by Table 1, is treated as shown in the diagram of the accompanying drawing. Analysis is as follows:

Table 1

|  | crude | calcined |
| --- | --- | --- |
| $UO_3$ | 77.40 | 82.30 |
| $Na_2O$ | 10.35 | 11.00 |
| $K_2O$ | 0.20 | 0.22 |
| $Al_2O_3$ | 1.00 | 1.06 |
| $Fe_2O_3$ | 0.85 | 0.90 |
| $SiO_2$ | 0.40 | 0.43 |
| MnO | 0.15 | 0.16 |
| MgO | 0.20 | 0.22 |
| $V_2O_5$ | 0.35 | 0.37 |
| CaO | 0.35 | 0.37 |
| Fire loss | 7.65 | 2.19 |
| Undetermined | 1.10 | 0.78 |

1000 kg of concentrate is attacked by acid solutions R1 and R2 resulting from recycling and whose composition is given by table II, at a rate of 104 kg of R1 and 5,517 kg of R2, for 1000 kg of concentrate.

After the attack operation, the solution is filtered or centrifuged to remove $CaSO_4$ and $SiO_2$ which are insoluble. The precipitate is rinsed with water, and the rinsing solution R1 is recycled for the attack operation.

The remaining solution L1 is then evaporated up to a temperature of 220°C. After cooling, a crystalline starter is introduced at about 70°C., and 1,011 kg of precipitate S2 is formed, the precipitate being separated by filtration from the solution L2. The precipitate S2 is washed with 1,071 kg of a sulphuric solution whose ratio E/A is 0.19. The washing solution mixes with solution L2 which in total has a weight of 5,419 kg and the composition shown in table II. This mixture is then diluted with 828 liters of water. After cooling, 2,119 kg of a precipitate S3 and the solution L3 is formed.

The precipitate is washed with 1,389 kg of a solution of sulphuric acid in water with a ratio E/A of 0.45; this washing solution is combined with the exhausted solution L3 to form the recycling liquor R2 whose weight is 5,517 kg.

tered, producing 12,031 kg of solution L1. The solid S1 after washing with 1,865 kg of water weighs 334 kg, the rinsing solution forming the recycling solution R1. The Table II

|  | R1 | R2 | L1 | L2 | S2 | L3 | S3 |
|---|---|---|---|---|---|---|---|
| $UO_2SO_4$ | 1.2 | 4.5 | 19.7 | 23.6 | 2.0 | 4.9 | 48.8 |
| $Na_2SO_4$ | traces | 2.5 | 5.9 | 2.7 | 24.9 | 2.7 | — |
| $K_2SO_4$ | traces | traces | 0.1 | — | 0.4 | — | — |
| $Al_2(SO_4)_3$ | traces | 0.07 | 0.5 | 0.1 | 3.4 | 0.1 | — |
| $Fe_2(SO_4)_3$ | traces | 0.04 | 0.4 | 0.1 | 2.3 | 0.1 | — |
| $H_2SO_4$ | 2.8 | 64.1 | 45.9 | 60.0 | 56.3 | 63.5 | 36.0 |
| $H_2O$ | 95.6 | 28.9 | 27.3 | 11.4 | 10.6 | 28.6 | 15.2 |
| Various | 0.3 | traces | 0.1 | 0.1 | 0.1 | 0.1 | — |
| E/A | 34.0 | 0.45 | 0.60 | 0.19 | — | 0.45 | — |

The precipitate S3 is then calcined at 900°C. This produces a substance which essentially comprises $U_3O_8$, the analysis of which is given by the following table. It will be noted that the impurities contents are much lower than the specifications applied for subsequent treatments in the nuclear energy industry.

Table III

| -U | 84.5% ± 0.5% | -V | 0.005% |
|---|---|---|---|
| -Al | 0.14% | -Mo | <0.002% |
| -Fe | 0.022% | -Si | 0.04% |
| -Mn | 0.001% | -P | <0.05% |
| -Mg | 0.005% | -As | <0.05% |
| -Ca | 0.013% | -S | <0.05% |
| -Na | 0.05% | -Cl | <0.005% |
| -K | 0.022% | -F | <0.005% |
|  |  | -Th | <0.1% |

EXAMPLE 2

An industrial concentrate of magnesia uranate of the following composition was treated in this example:

Table IV

| $-UO_3$ | 53.7% | -CuO | 0.5% |
|---|---|---|---|
| -MgO | 8.6 | -MnO | 2.5 |
| -CaO | 0.33 | $-V_2O_5$ | 0.9 |
| $-SiO_2$ | 2.3 | $-Na_2O$ | 0.04 |
| $-Al_2O_3$ | 7.4 | -Volatile | 2.23 |
| $-Fe_2O_3$ | 4.2 | $-H_2O$ | 5.9 |
|  |  | $-SO_3$ | 11.4 |

The CaO content on the one hand and the amount of silica on the other hand are such that the attack operation should be effected with a ratio E/A No. 1.6 in the solution L1. 1000 kg of concentrate is treated with 1,997 kg of recycling solution R1, 7,062 kg of recycling solution R2 and 2,460 kg of water. The composition of the solutions R1 and R2 is given in table V. After cooling, 12,497 kg of suspension is obtained, which is filtered, producing 12,031 kg of solution L1. The solid S1 after washing with 1,865 kg of water weighs 334 kg, the rinsing solution forming the recycling solution R1. The solution L1 is then evaporated by heating at atmospheric pressure up to a temperature of 235°C., then cooled. During this operation a small amount (0.1 kg) of crystallization starter is added, when the temperature of the solution is 180°C. during evaporation and 80°C. during cooling.

There is obtained a suspension of the solid S2 in the solution L2, in which the ratio E/A is 0.19, which is separated by filtration, the solid being washed with 2,022 kg of a sulphuric solution in which the ratio E/A is 0.19, weighs after washing 1,675 kg damp. The washing solution is mixed with the solution L2; there is added to this solution which weighs 6,837 kg, 1,206 kg of water, and cooling is effected. The mixture separates into a precipitate of hydrated uranyl acid sulphate and the solution L3 in which the ratio E/A is 0.45. The 7,043 kg of suspension is filtered; the solid S3, washed with 392 kg of a sulphuric solution in which the ratio E/A is 0.45, weighs after washing 1,373 kg in a damp condition. The solution L3 to which is added the washing solution, weighs 7,062 kg and forms the recycling solution R2.

Analysis of S1 in a damp condition, L1, S2 in a damp condition, L2 + S2 2 washing solution, S3 in a damp condition, L3 + S3 washing solution, are given in table V.

Table V

|  | R1 | S1 | L1 | S2 | L2 + S2 washing solution | S3 | R2 = L3 + S3 washing solution |
|---|---|---|---|---|---|---|---|
| $UO_2SO_4$ | 1.81 | 0.3% | 8.43% | 0.72% | 14.63% | 49.1% | 4.65% |
| $MgSO_4$ | 0.50 | — | 2.35% | 15.32% | 0.38% | — | 0.38% |
| $Al_2(SO_4)_3$ | 0.75 | — | 3.71% | 14.80% | 2.91% | — | 2.82% |
| $Fe_2(SO_4)_3$ | 0.15 | — | 0.87% | 6.27% | — | — | — |
| $SiO_2$ | — | 6.9% | — | — | — | — | — |
| $MnSO_4$ | 0.10 | — | 0.50% | 3.16% | 0.10% | — | 0.10% |
| $CuSO_4$ | — | — | 0.08% | 0.60% | — | — | — |
| $Na_2SO_4$ | — | — | 0.01% | 0.06% | — | — | — |
| $V_2O_5, 2\ SO_3$ | — | — | 0.14% | 1.01% | — | — | — |
| $CaSO_4$ | 0.35 | 2.4% | — | — | — | — | — |
| $H_2SO_4$ | 6.91 | 0.6% | 32.25% | 48.92% | 68.85% | 35.8% | 63.50% |
| $H_2O$ | 89.43 | 89.8% | 51.66% | 9.14% | 13.12% | 15.1% | 28.55% |
| E/A | 12.95 | — | 1.6 | — | 0.19 | 0.42 | 0.45 |

The precipitate S3, after calcination at 900°C., provides 517 kg of uranium oxide $U_3O_8$, the analysis of which is as follows:

Table VI

| U | 84.2 % ± 0.5% | V | <0.050% |
|---|---|---|---|
| Al | 0.020 " | Mo | 0.002" |
| Fe | 0.002 " | Si | <0.050" |
| Mn | <0.050 " | P | 0.050" |
| Mg | 0.001 " | As | 0.050" |
| Ca | 0.002 " | S | 0.10 " |
| Na | 0.002 " | Cl | 0.015" |
| K | 0.020 " | F | 0.006" |

Table VI — Continued

| | | |
|---|---|---|
| Th | 0.1 | '' | nation at 900°C. permits 433 kg of pure $U_3O_8$ to be obtained.

The analyses of R1, R2, S1, L1, S2, L2, S3, L3 = R2 are given in table VIII.

Table VIII

| | R1 | L3=R2 | S1 | L1 | S2 | L2 + washing | S3 |
|---|---|---|---|---|---|---|---|
| $UO_2SO_4$ | 3.25 | 4.61 | 0.07 | 8.93 | 0.22 | 15.32 | 48.79 |
| $MgSO_4$ | 0.50 | 0.36 | — | 1.36 | 5.73 | 0.39 | — |
| $CaSO_4$ | 0.33 | — | 1.61 | — | — | — | — |
| $SiO_2$ | — | — | 6.34 | — | — | — | — |
| $Al_2(SO_4)_3$ | 1.75 | 2.80 | — | 4.78 | 15.39 | 2.98 | — |
| $Fe_2(SO_4)_3$ | 1.59 | — | — | 4.34 | 21.89 | — | — |
| $CuSO_4$ | 0.04 | — | — | 0.11 | 0.54 | — | — |
| $MnSO_4$ | 0.34 | 0.10 | — | 0.94 | 4.44 | 0.11 | — |
| $V_2O_5, 2 SO_3$ | 0.06 | — | — | 0.16 | 0.81 | — | — |
| $H_2SO_4$ | 11.13 | 63.54 | 0.24 | 30.53 | 42.94 | 68.24 | 36.06 |
| $H_2O$ | 81.02 | 28.59 | 91.74 | 48.85 | 8.04 | 12.96 | 15.15 |
| E/A | 7.29 | 0.45 | — | 1.6 | 0.187 | 0.19 | 0.42 |

EXAMPLE 3

An industrial concentrate of magnesia uranate having the following composition was treated in this example:

Table VII

| — $UO_3$ | 44.46% | — CuO | 0.50% |
|---|---|---|---|
| — MgO | 3.56'' | — MnO | 3.87'' |
| — CaO | 0.58'' | — $V_2O_5$ | 0.80'' |
| — $SiO_2$ | 5.56'' | — $Na_2O$ | — |
| — $Al_2O_3$ | 8.50'' | — Volatile | 2.15'' |
| — $Fe_2O_3$ | 16.20'' | — $H_2O$ | 10.20'' |
| | | — $SO_3$ | 3.62'' |

The method according to the invention can be applied to such a concentrate, the problems involved in the presence of large proportions of $Fe_2O_3$ and $SiO_2$ are overcome by bringing the ratio E/A of the solution L1 to a value of 1.6. It will be noted that with this concentrate, an attack with a ratio E/A of a value of 0.19 in the solution L1 results in the solution rapidly solidifying.

1000 kg of ore is attacked with 4,220 kg of solution R1 and 5,784 kg of solution R2. The resulting suspension which weighs 10,983 kg is filtered, the solid matter is washed with 3,469 kg of water, the washing waters forming the recycling solution R1; the washed precipitate S1 weighs 877 kg. The clear filtered solution L1 weighs 9,355 kg, it is heated to boiling at atmospheric pressure until the substance reaches a temperature of 230°C., cooling then being effected. During this operation, 0.5 kg of crystalline starter is added on two occasions, at 175°C. during evaporation and at 80°C. during cooling. 3,974 kg of a suspension is obtained, which is filtered, and the solid matter is washed with 1,999 kg of an 84% solution of $H_2SO_4$ (E/A = 0.19), the washing solution being combined with the filtered solution; 1,854 kg of mechanically dried solid matter, and 5,422 kg of solution L2 are obtained. 950 kg of water is added to the solution L2 2 and cooled. 6,372 kg of suspension is obtained, which is filtered. The solid matter is washed with 563 kg of a 69% solution of $H_2SO_4$ (E/A = 0.45); the washing solution being combined with the filtered solution, there is obtained 5,784 kg of solution L3 which forms the recycling solution R2 and 1,157 kg of mechanically dried solid matter S3 which after calcination at 900°C. permits 433 kg of pure $U_3O_8$ to be obtained.

The oxide produced is of the same composition as that of Example 2.

EXAMPLE 4

Uranate of lime having the following composition was treated in this example:

Table IX

| $UO_3$ | 27.0% | $SiO_2$ | 5.6% |
|---|---|---|---|
| CaO | 19.4'' | MgO | 0.2'' |
| $Fe_2O_3$ | 3.2'' | CuO | 0.3'' |
| $Al_2O_3$ | 3.2'' | $V_2O_5$ | 0.5'' |
| MnO | 5.6'' | $SO_3$ | 27.0'' |
| | | $H_2O$ | 8.0'' |

The method according to the invention can be used for this substance, the high content of CaO and also that of $SiO_2$ result in the attack operation being effected with solutions such that the ratio E/A of the solution L1 is 1.6.

1000 kg of concentrate is treated by 4,679 kg of recycling solution R1 and 4,545 kg of recycling solution R2.

After filtration and washing of the solid matter with 3,733 kg of water, there is obtained 1,570 kg of washed and damp solid matter S1, 4,679 kg of S1 washing solution, that solution forming the recycling solution R1, and 7,708 kg of clear solution L1 which is concentrated by evaporation at atmospheric pressure, up to a temperature of 230°C. This thus removes 3,677 kg of water and 33 kg of $H_2SO_4$.

During cooling of the solution, 0.5 kg of crystalline starter is added at 130°C.

The suspension is filtered and the solid matter is washed with 879 kg of 84% sulphuric solution (E/A = 0.19), and there is obtained 749 kg of washed and damp solid matter S2 and 4,128 kg of solution L2 mixed with the washing solution.

762 kg of water is added to this solution and after cooling, the solid matter is filtered and washed with 350 kg of 69% sulphuric solution (E/A = 0.45).

The solution L3 is obtained which, mixed with the washing solution, weighs 4,545 kg and forms the recycling solution R2, and 694.5 kg of washed and damp solid matter which, after calcination, provides 259 kg of very pure $U_3O_8$. The analyses of R1, R2, S1, L1, S2, L2 + washing, and S3, are given in table XI.

Table X

|  | R1 | R2 | S1 | L1 | S2 | L2 + washing | S3 |
| --- | --- | --- | --- | --- | --- | --- | --- |
| $UO_2SO_4$ | 2.54 | 2.70 | 0.05 | 6.07 | 0.80 | 11.18 | 48.79 |
| $MgSO_4$ | 0.12 | 0.35 | — | 0.29 | 0.80 | 0.39 | — |
| $CaSO_4$ | 0.33 | — | 30.01 | — | — | — | — |
| $SiO_2$ | — | — | 3.57 | — | — | — | — |
| $Al_2(SO_4)_3$ | 1.26 | 2.75 | 0.02 | 3.01 | 14.29 | 3.03 | — |
| $Fe_2(SO_4)_3$ | 0.44 | — | 0.01 | 1.04 | 10.68 | — | — |
| $CuSO_4$ | 0.03 | — | — | 0.08 | 0.80 | — | — |
| $MnSO_4$ | 0.67 | 0.10 | 0.01 | 1.60 | 15.89 | 0.11 | — |
| $V_2O_5 \cdot 2 SO_3$ | 0.05 | — | — | 0.12 | 1.25 | — | — |
| $H_2SO_4$ | 14.18 | 64.90 | 1.78 | 33.77 | 46.70 | 71.67 | 36.07 |
| $H_2O$ | 80.37 | 29.20 | 66.17 | 54.03 | 8.78 | 13.62 | 15.14 |
| E/A | 5.67 | 0.45 | 3.71 | 1.6 | 0.19 | 0.19 | 0.42 |

Table XI

| U | 84.3 % ± 0.5 | Mo | 0.0012% |
| --- | --- | --- | --- |
| Al | 0.0900" | Fe | 0.0150" |
| Ca | 0.0070" | V | 0.0080" |
| Mn | 0.0430" | Si | 0.0040" |
| Mg | 0.0015" | S | <0.0500" |
| K | 0.0035" | P | <0.0500" |
| Na | 0.0018" | Th | <0.1000" |
|  |  | As | <0.0500" |

It will be apparent that various changes and modifications can be made in the details of procedure and formulation without departing from the spirit of the invention, especially as defined in the following claims.

We claim:

1. A method for the production of uranium compounds in a high state of purity comprising the steps of contacting a uranium-bearing material with an aqueous solution of sulfuric acid, separating undissolved solids to leave a first leach solution, adjusting the ratio of water to free sulfuric acid in the first leach solution to within the range of 0.16 to 0.26 to precipitate impurities from the first leach solution, removing the precipitate formed to leave a second leach solution, diluting the second leach solution with water to adjust the ratio of water to free sulfuric acid to within the range of 0.35 to 0.50 and separating the uranium compounds therefrom.

2. A method according to claim 1 wherein the ratio of the first leach solution is brought to the selected value by evaporation of water at a temperature of from 210°C. to 240°C. at atmospheric pressure.

3. A method according to claim 1 wherein the ratio of the first leach solution is brought to a value of from 0.18 to 0.20.

4. A method according to claim 1 wherein the second leach solution is diluted to a value of the ratio of from 0.43 to 0.47.

5. A method according to claim 1 wherein the uranium-bearing material is a concentrate titrating more than 0.05% of Ca with respect to uranium, and the aqueous solution of sulfuric acid used has a ratio of water to free acid higher than 0.5.

* * * * *